United States Patent
Seidel et al.

(10) Patent No.: US 8,057,158 B2
(45) Date of Patent: Nov. 15, 2011

(54) OSCILLATION DAMPING OF A WIND TURBINE

(75) Inventors: Marc Seidel, Osnabruck (DE); Martin Von Mutius, Ascheffel (DE); Dirk Steudel, Kiel (DE)

(73) Assignee: Repower Systems AG, Hamburg (DE)

( * ) Notice: Subject to any disclaimer, the term of this patent is extended or adjusted under 35 U.S.C. 154(b) by 975 days.

(21) Appl. No.: 11/941,459

(22) Filed: Nov. 16, 2007

(65) Prior Publication Data

US 2008/0118342 A1    May 22, 2008

(30) Foreign Application Priority Data

Nov. 17, 2006    (DE) .......................... 10 2006 054 666

(51) Int. Cl.
*F03D 7/02* (2006.01)

(52) U.S. Cl. ................... 415/1; 415/4.3; 415/17; 416/1; 416/13; 416/15; 416/31; 416/44; 290/44; 290/55

(58) Field of Classification Search ............... 415/1, 3.1, 415/4.1, 4.3, 4.5, 17; 416/1, 13, 15, 31, 41, 416/44; 290/44, 55
See application file for complete search history.

(56) References Cited

U.S. PATENT DOCUMENTS

| 4,333,018 | A  | * | 6/1982 | Bottrell ........................ 416/41 |
| 6,525,518 | B1 |   | 2/2003 | Garnaes |
| 6,946,751 | B2 | * | 9/2005 | Yoshida et al. ................. 416/31 |
| 7,095,129 | B2 | * | 8/2006 | Moroz ............................ 290/44 |

FOREIGN PATENT DOCUMENTS

| DE | 19860215 |    | 3/2000 |
| DE | 19860215 | C1 | 3/2000 |
| DE | 10016912 | C1 | 12/2001 |
| DE | 10141098 |    | 3/2003 |
| DE | 10141098 | A1 | 3/2003 |
| DE | 10 2004 024564 | B4 | 12/2005 |
| DE | 102004024564 |    | 12/2005 |
| DE | 102004024564 | B4 | 12/2005 |

* cited by examiner

*Primary Examiner* — Igor Kershteyn
(74) *Attorney, Agent, or Firm* — Rankin, Hill & Clark LLP

(57) ABSTRACT

The invention relates to a wind turbine and a method for operating the wind turbine planted in the floor of a body of water. The wind turbine includes a support structure and a rotor, which is arranged on the support structure. The rotor has a rotor blade. The wind turbine operates in a trundle mode in order to reduce the oscillations in the support structure created through mechanical impacts on the support structure.

19 Claims, 4 Drawing Sheets

OSCILLATION DAMPING OF A WIND TURBINE

BACKGROUND OF THE INVENTION

The invention relates to a wind turbine and a method for operating the wind turbine. More specifically, the present invention relates to an offshore wind turbine planted in a floor of a body of water.

BRIEF SUMMARY OF THE INVENTION

A method for controlling and regulating a wind turbine as well as the corresponding wind turbine are disclosed in DE 10 2004 024 564 B4. The wind turbine operates in trundle mode and includes a machine house that is adjustable around an azimuth angle, at least one rotor blade that is adjustable around its longitudinal axis and a power supply are provided. Depending on a wind speed and direction, an azimuth angle position is set for the machine house and one or more adjustment angles is/are set for the at least one rotor blade when a measured wind speed exceeds a predetermined speed value. An azimuth drive for setting the azimuth angle position of the machine house is driven and according to at least one of the pitch drives (rotor blade angle drive) powered by the power supply sets the at least one rotor blade to the adjustment angle determined by the control unit, whereby the at least one rotor blade turns in the set position at a rotation speed from a predetermined rotation speed range.

A disadvantage to offshore wind turbines is that there is a risk when the wind turbine is at a standstill and the waves impacting the base of the wind turbine in the first or second bending resonance frequency can stimulate the entire system so that undesired oscillations can result. This can lead to damage to or premature aging of the wind turbine.

Therefore, it is an object of the present invention is to reduce or avoid undesired oscillations in the support structure of a wind turbine.

It is a further object to prevent the wind turbine from becoming damaged or aging prematurely.

It is still yet another object of the present invention to provide a wind turbine whereby the wall thickness of the support structure and/or the tower is less than conventional wind turbines thereby requiring less material.

The present invention overcomes the above mentioned disadvantage by providing a method for operating a wind turbine planted in the floor of a body of water, wherein the wind turbine comprises a support structure and a rotor, wherein the rotor has a rotor blade, wherein the wind turbine is operated in trundle mode in order to reduce the oscillations in the support structure caused by the mechanical effects on the support structure.

The rotor can be arranged on a tower. The tower can be the support structure or a part of the support structure. In accordance with the present invention, it has become known that the effect of an aerodynamic damping can be used by operating the wind turbine in trundle mode in order to decrease the oscillations in the support structure. For this, the operation of the wind turbine in trundle mode should preferably be designed such that the trundle speed of the rotor, preferably in idling, is set such that sufficient aerodynamic damping occurs. The damping of the oscillations is based on the movement of the rotor caused by the oscillations of the support structure in the air mass underlying the idleness effect or inertia effect of the flow channel, which is created by the trundle mode. The running of the wind turbine in trundle mode includes in particular a mode with a constant blade angle, which in the case of the prevailing wind speed leads to a rotation of the rotor, wherein an active monitoring of operating parameters even at a constant blade angle in particular the speed and/or the wind speed is also included.

In terms of the invention, the term support structure covers the supporting structure of the wind turbine, (i.e. the tower and the foundation) which carries the rotor above the ocean bed or above sea level in the case of floating foundations. In addition, the ballast should also preferably be counted as part of the support structure. The foundation is the part of the support structure, which reaches from the ocean or sea bed to the water surface or to the tower base. The ballast is—especially in the case of a monopile—the part of the wind turbine that is anchored or sunk into the ground. In the case of a flat foundation or gravitational foundation, the ballast is the bearing surface on the sea floor with its flexibility or its resilience.

The mechanical impacts on the support structure are preferably induced by water waves. The operating procedure for the wind turbine is preferably to be used for offshore wind turbines. Preferably, the wind turbine does not deliver power to a network during this procedure or when running idle. Preferably, the operating procedure is operated at wind speeds below the nominal wind speed of the wind turbine and in particular preferably under the startup wind speed of the wind turbine. Preferably, the trundle mode of a wind turbine means that the rotor is running idle, wherein the generator is preferably delivering no power to the network. The created torque of the rotor is then very low and mainly serves to overcome the friction resistances of the power train. Trundle mode also includes a motor-driven operation of the generator when winds are calm (i.e. the power for overcoming the air resistance of the rotor is taken in this case from the network).

Preferably, the wind turbine has a blade angle adjustment device, wherein a specifiable or predetermined blade angle is set depending on at least one parameter, in particular an environmental parameter. Within the framework of the invention, a parameter is to be understood as a physical variable like wind speed, average wind speed, wave size, wave length and/or wave speed, oscillation amplitude of the tower head, oscillation frequency of the tower head, etc. The blade angle adjustment device is preferably arranged on the blade root of the rotor blade and adjusts the rotor blade around the longitudinal axis of the rotor blade for a specifiable blade angle. If the blade angle (pitch angle) is set depending on the trundle speed and/or the wind speed and/or a measured oscillation amplitude of the support structure, a particularly secure method execution is possible. A specifiable or predetermined trundle speed is preferably set. Furthermore, the trundle speed is preferably set depending on the wind speed and/or the average blade angle. An average blade angle is within the framework of the invention in particular a temporal average value of a blade angle; however, in the case of a single blade adjustment, the average value of the blade angle also comprises at least two rotor blades.

The method is particularly preferred when the trundle speed, at wind speeds above 3 m/s, lies between 10% and 80%, in particular between 15% and 60% of the nominal speed of the wind turbine. This enables a particularly efficient reduction in the oscillations in the support structure of the wind turbine caused by mechanical effects on the support structure, without injecting into the system additionally high loads from the rotor aerodynamic system.

It is also especially preferred when at least one parameter (measurement value) of the wave height, the wave separation distance, the wave speed, the tower head acceleration, the oscillation amplitude of the support structure, the average wind speed or the average trundle speed is measured and compared with a specifiable or predetermined parameter (standard value) and the trundle speed or the blade angle or the tracking angle of the rotor (azimuth angle) is controlled or regulated depending on the result of the comparison. A very exact method execution is thus possible. For example, the trundle speed can be increased when a specified tower head acceleration value is exceeded and/or the blade angle can be adjusted when an average wind speed is reached. In the case of the measurement or evaluation of the wave separation distance and/or the wave speed and/or the wave height, it can also for example be evaluated in advance whether an undesired oscillation in the support structure of the wind turbine can be created and accordingly set a trundle speed before the occurrence of undesirably heavy oscillations in the support structure so that a stabilization of the support structure takes place before the occurrence of the accordingly mechanical impacts on the support structure.

The rotor is preferably made to track a wind direction, wherein the wind tracking is dependent on the wind direction and/or the ratio of the amplitudes of the tower head longitudinal to the tower head lateral oscillation. The tracking of the rotor relative to a wind direction is understood in particular to mean an azimuth angle adjustment of the rotor or the tower head or the machine house. Within the framework of the invention, the term tower head also includes the term machine house.

A very secure method is possible when a lower and/or an upper speed limit value of the rotor can be specified or predetermined, wherein a change is made to the blade angle of the rotor blade when the lower speed limit value is fallen short of or when the upper speed limit value is exceeded.

The rotor blade is preferably placed in a flag position when the power supply is missing. Power supply here means the supply from the electrical network or auxiliary power systems. The latter can be designed in the form of emergency power aggregates or accumulators, which enable the continuation of trundle mode in the case of a power failure. If this type of auxiliary power supply also fails, the rotor blades are moved to the secure flag position via the emergency supply of the blade adjustment (pitch batteries).

The present invention further overcomes the above mentioned disadvantage by providing a wind turbine planted in the floor of a body of water, for example an offshore wind turbine, with a support structure and a rotor, which comprises a rotor blade. A sensor is provided, which measures the amplitude, the acceleration and/or the direction of an oscillation of the support structure and/or an acceleration of the support structure and/or at least one physical variable, which mechanically impacts the wind turbine. A control or regulation device is provided, which specifies a blade angle of a rotor blade or a trundle speed for reducing the oscillations of the support structure created by the mechanical impacts on the support structure depending on at least one such measurement value. Also, a blade angle adjustment device is preferably provided, which sets the blade angle specified by the control or regulation device. A trundle speed is according to the invention also a trundle rotation speed.

In particular in the case of a wind turbine planted in the floor of a body of water, a physical variable is the wave height, the wave separation distance and/or the wave speed.

Preferably, a sensor is provided, which measures an average trundle speed of the rotor or a calculating device such as a computer, which can also be integrated in it separately from the control or regulation device or can be it itself, which determines the average trundle speed, wherein the average trundle speed is processed in the control or regulation device in order to specify the blade angle of the rotor blade. Preferably, a sensor is provided, which measures a wave height, a wave separation distance, a wave speed and/or a wave direction, wherein the measurement value or the measurement values are processed in the control or regulation device in order to specify the blade angle of the rotor blade and/or the tracking angle of the rotor.

Furthermore, a software product with program code means is preferably provided in order to execute all process steps in accordance with the method according to the invention or a preferably one on a computer and/or a control or regulation device of a wind turbine. This is a computer or a control or regulation device of a wind turbine. Preferably, the software product can be saved on at least one data carrier or medium.

It is especially preferred when a control or regulation device of a wind turbine is specified, which is designed to execute a software product according to the invention.

The invention is described below, without restricting the general intent of the invention, based on exemplary embodiments in reference to the drawings, whereby we expressly refer to the drawings with regard to the disclosure of all details according to the invention that are not explained in greater detail in the text.

Additional benefits and advantages of the present invention become apparent to those skilled in the art to which it pertains upon a reading and understanding of the following detailed specification.

DETAILED DESCRIPTION OF THE INVENTION

In the following description and figures, the same or similar types of elements or corresponding parts are provided with the same reference numbers thereby preventing the item from being reintroduced.

Figure 1:
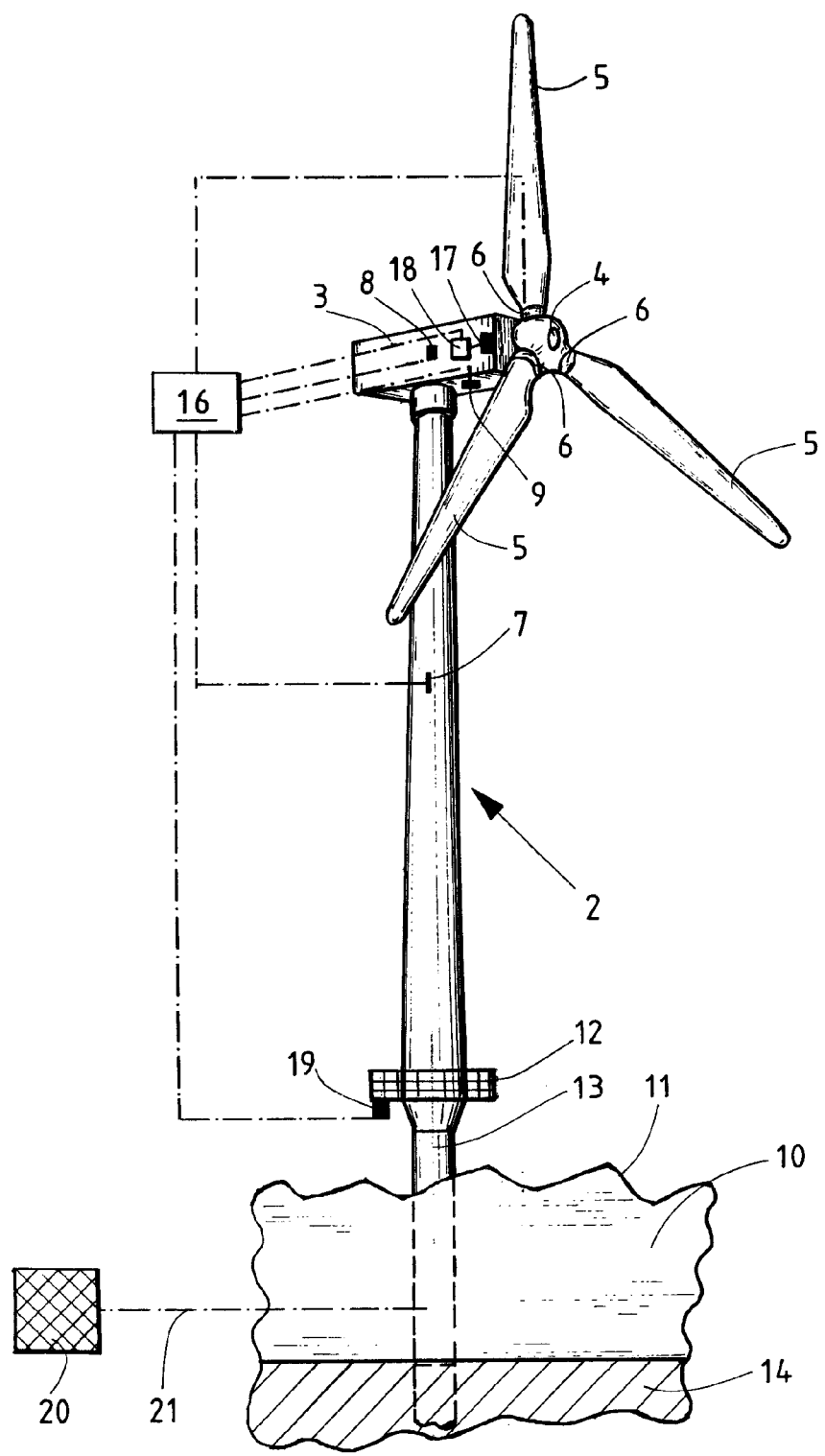
FIG. 1 shows a schematic representation of a wind turbine according to the invention.

FIG. 1 shows a schematic representation of a wind turbine according to the invention by means of which the method according to the invention can be performed. The wind turbine is provided with reference number 1. It has a tower head height of approximately 90 m and a rotor diameter of approximately 126 m. A tower 2 is provided, which is planted in the floor of a body of water 14 by means of a monopile 13. The support structure is the combination of the tower 2 and the monopile 13. The foundation is not indicated here. The body of water is labeled with reference number 10. Water depths of 20 m to 30 m prevail for example in the case of offshore wind turbines. Instead of a foundation using monopiles, a gravitational foundation or a tripod or a jacket foundation can also be provided.

In order to create the least possible mechanical impacts through waves 11 on the wind turbine, it makes sense to offer the smallest possible contact surface, which is why a gravitational foundation is less suitable or in the case of a gravitational foundation, greater oscillation effects can have an impact through the impact of mechanical energy on the tower 2 or the foundation of the tower 2.

A platform 12 is also shown, on which people for example can stand. The height of this platform 12 above the surface of the water 10 is preferably designed such that the platform 12 is not impacted by very high waves.

The wind turbine 1 has a tower head 3 or a pod or nacelle 3 or a machine house 3, in which for example a generator and a shaft can be arranged. The shaft is provided with a hub 4, on which three rotor blades 5 are arranged, the rotor blade or pitch angle of which can be adjusted via schematically indicated blade angle adjustment devices 6 as is customary.

In the case of the types of wind turbines shown in FIG. 1, in particular in offshore wind turbines, there is now a risk that in standstill the waves 11 impacting the foundation, in this case the monopile 13, can stimulate the wind turbine in the first and second bending resonance frequency of the overall system. The first bending resonance frequency is an oscillation over the entire length of the wind turbine with a large amplitude in the tower head and the second bending resonance frequency is an oscillation with a belly or an antinode in the middle of the wind turbine. In the case of standing units, there is almost no aerodynamic damping.

In accordance with the invention, it is ensured that in the case of the risk of bending resonance frequencies of the wind turbine or in the case of existing oscillations in the wind turbine, the wind turbine is operated in trundle mode, i.e. with a rotation of the rotor so that an aerodynamic damping is built up or created. It is hereby especially preferred if the trundle speed of the rotor in idle mode is set such that sufficient aerodynamic damping is created. The speed in trundle mode is hereby increased so far that the oscillation of the tower, which has occurred, or the oscillation, which can occur due to physical parameters, is dampened. The damping leads to the oscillation amplitude of a bending moment of the tower being at least cut in half. If for example the oscillations are still too high in the case of a normal trundle speed of 0 to 2 revolutions per min on the rotor side at a nominal speed of 12 revolutions per min, the trundle speed can for example be increased to 8 revolutions/min such that an aerodynamic damping is created. The rotor of the wind turbine 1 thus turns or rotates without power or energy being removed from the system in order to be fed to a network or to drive a consumer.

In the exemplary embodiment according to FIG. 1, the network is indicated schematically with the reference number 20. The power supply network 20 is connected to the wind turbine with a cable 21.

In the exemplary embodiment according to FIG. 1, multiple sensors 7-9, 17 and 19 are provided, which have at least partially different functions. It is not necessary to provide all sensors. The sensor 7 determines oscillations in the tower 2, which can typically occur in the second bending resonance frequency of the overall system. The sensor 7 is preferably arranged in the middle of the overall system preferably at a location, which unnecessarily corresponds with the geometric center of the overall system, but rather the location of the wind turbine, where the belly or antinode of the second bending resonance frequency of the overall system of the wind turbine has the largest amplitude. The sensor 7 can be a strain gauge strip. It can also be an acceleration sensor.

The sensors 8 and 9 can for example be acceleration sensors, which measure a tower head oscillation in the tower head longitudinal direction and lateral direction. The physical parameter, which can be measured here, is for example the oscillation amplitude, the oscillation speed and/or the acceleration. For this, the sensors already located in a tower head in normal mode can also be used, which create for example an emergency off signal when the oscillations become too strong, for example with respect to the amplitude or the acceleration. The sensors shown in FIG. 1 are only shown very schematically. The sensor 17 can for example serve to measure a speed of the rotor. The calculating device 18 can be provided in order to determine the average trundle speed or average speed. Moreover, a sensor 19 is provided, which can serve to measure the wave height, a wave separation distance and/or a wave speed. The sensor 19 is preferably a sensor based on electromagnetic waves, for example an infrared sensor or an optical sensor. The sensor 19 can in particular be designed as a separation distance sensor or as a Doppler sensor. The sensors are connected with a schematically shown control or regulation device 16 with lines shown with dotted and dashed lines, in which the parameters important for the control or regulation of the wind turbine such as for example a blade angle standard value or a trundle speed standard value can be calculated from the measurement results.

Figures 2A, 2B:
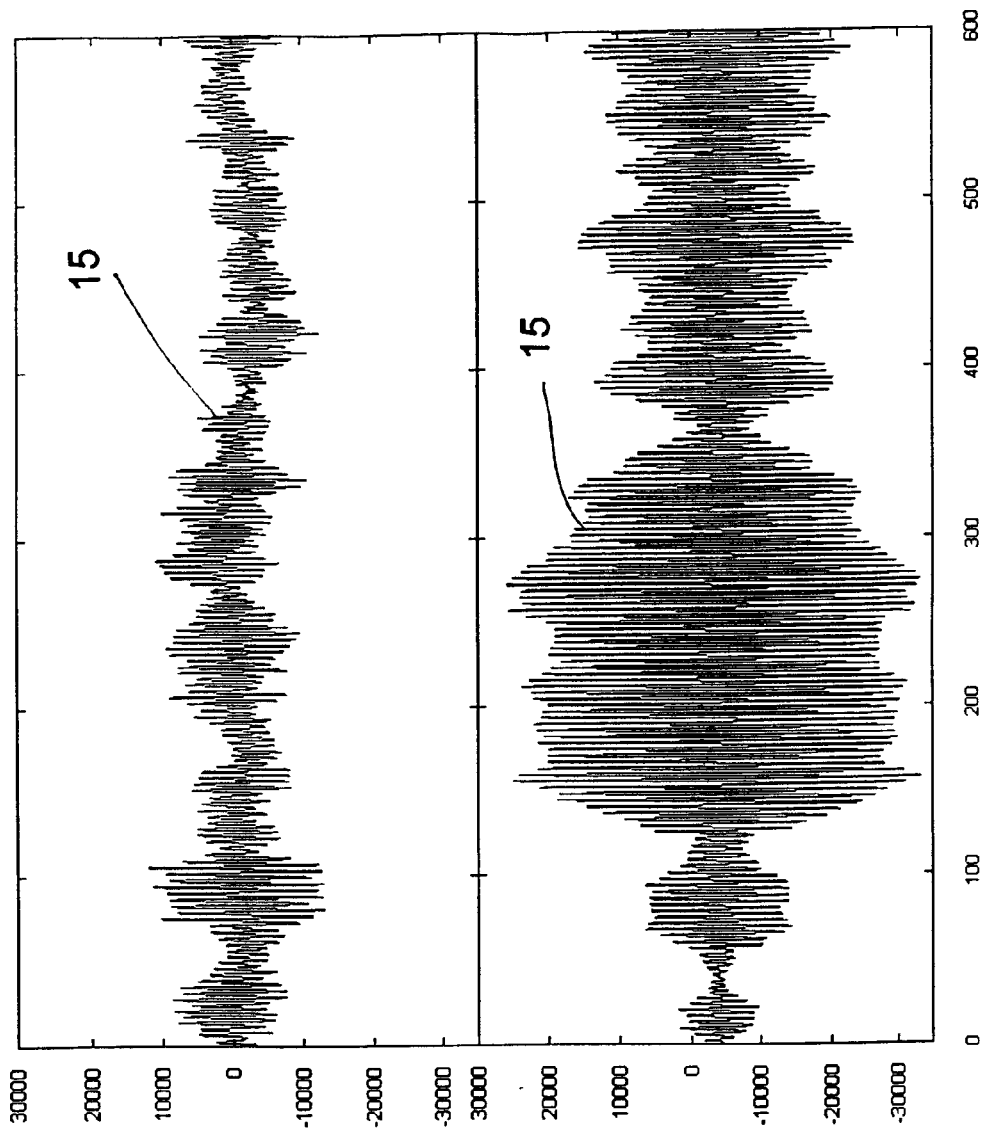
FIG. 2a shows a schematic diagram of a longitudinal bending moment of a longitudinal tower oscillation of a wind turbine when performing a method according to the invention when the wind speed is 3 m/s.
FIG. 2b shows a schematic diagram of a longitudinal bending moment of a longitudinal tower oscillation of a wind turbine without performing the method according to the invention when the wind speed is 3 m/s.

FIG. 2 shows schematic diagrams of a tower foot bending moment in kNm over time in seconds in the case of a wind speed of 3 m/s. FIG. 2a shows the tower foot bending moments, which occur during the operation of a wind turbine according to the invention or using a method according to the invention. In this case, the pitch angle is set to 10°, wherein a pitch angle of 90° means the flag position. In FIG. 2b, the pitch angle is set to 90°. The method according to the invention is not used in FIG. 2b. It is easy to see that the amplitudes in the curve are considerably larger according to the method not according to the invention in FIG. 2b, which leads to a considerably higher load of the wind turbine and thus to an increased wear and tear or the necessity of producing a more stable wind turbine in comparison to the case according to FIG. 2a, in which a corresponding method according to the invention is performed at a constant pitch angle of 10°.

Figures 3A, 3B:
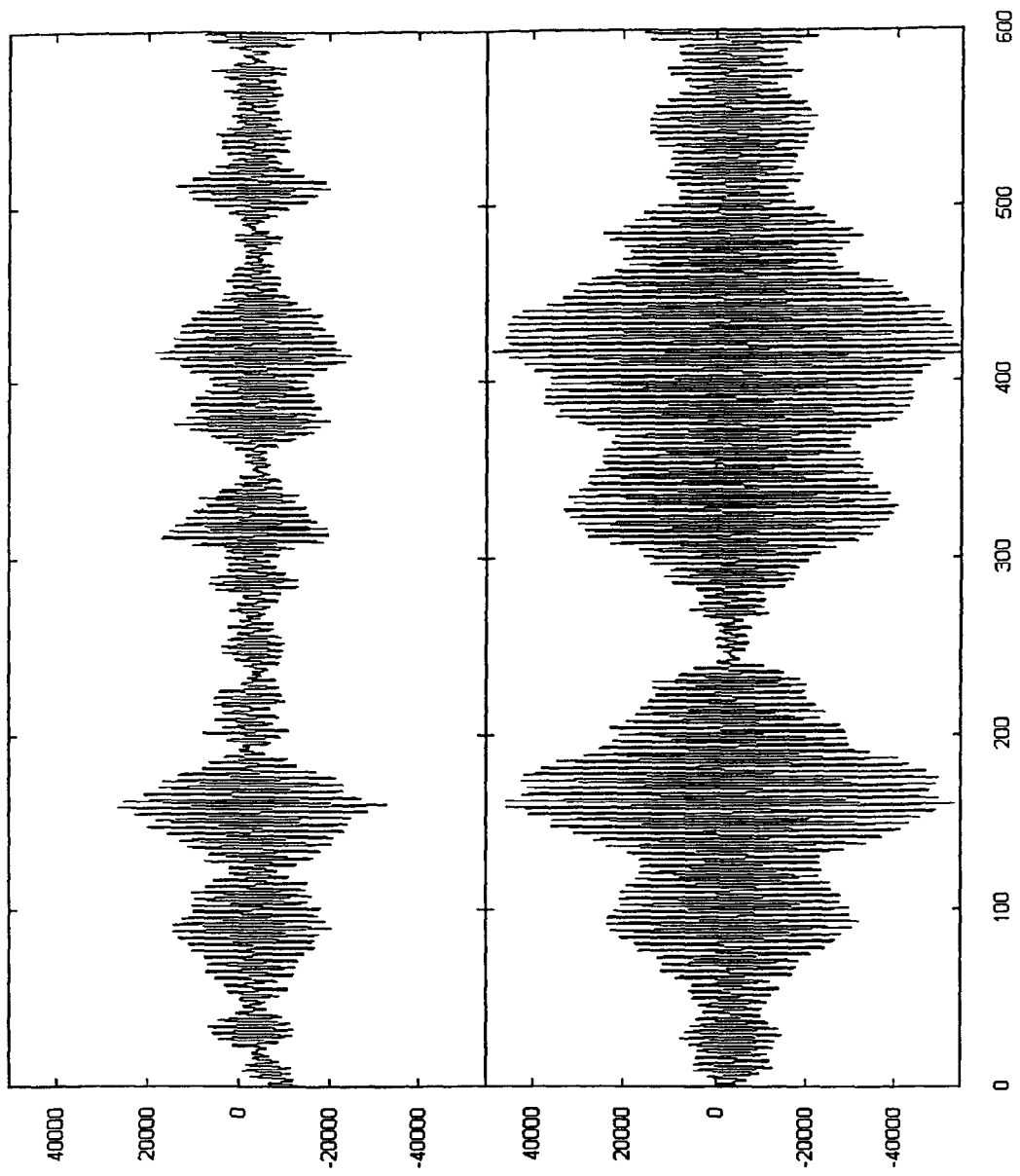
FIG. 3a shows a schematic diagram of a longitudinal bending moment of a longitudinal tower oscillation of a wind turbine when performing a method according to the invention when the wind speed is 6 m/s.
FIG. 3b shows a schematic diagram of a longitudinal bending moment of a longitudinal tower oscillation of a wind turbine without performing the method according to the invention when the wind speed is 6 m/s.

Corresponding curves are shown in FIGS. 3a and 3b, wherein these are curves, which result from a wind speed of 6 m/s. FIG. 3a again shows the tower foot bending moments during the performance of the method according to the invention and namely with a pitch angle of 20°, while FIG. 3b shows a diagram, in which the tower foot bending moments were measured without the method according to the invention (pitch angle=90°). The diagrams shown can also represent calculated or simulated values.

Figure 4:
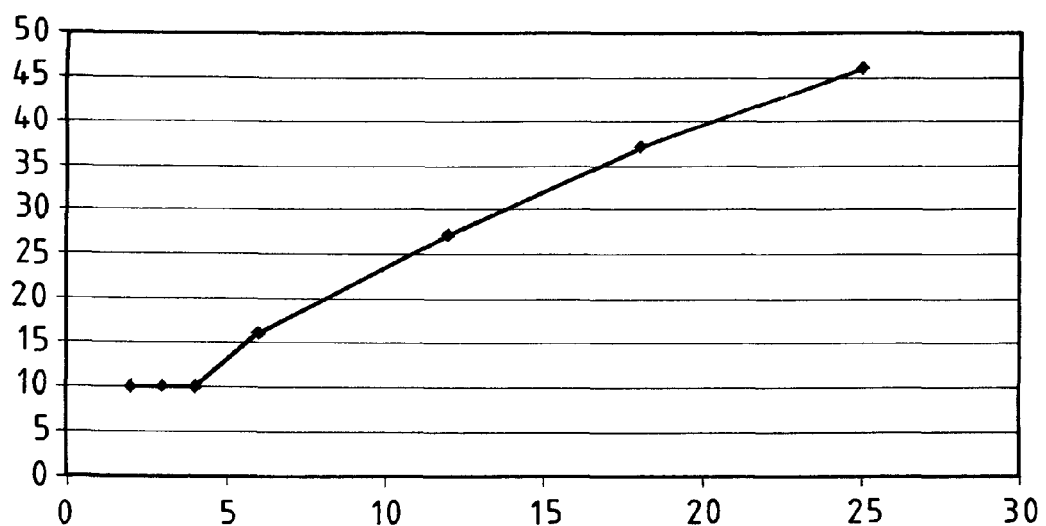
FIG. 4 shows a schematic diagram of a characteristic line of the blade angle over the wind speed.

In the case of a controller or regulator depending on the wind speed, a characteristic line of the pitch angle over the wind speed according to FIG. 4 is preferably used, wherein the pitch angle is applied in degrees over the wind speed in m/s. It can be seen that the pitch angle is also increased at higher wind speeds. It can be possible in the case of corresponding wind turbines that the pitch angle is also larger at slower wind speeds so that a minimum pitch angle results at average wind speeds.

Even in the case of relatively small wave heights, a resonance of the wind turbines can be stimulated based on the wave period. A typical natural frequency or eigenfrequency lies at $f_0$=0.27 Hz, i.e. a period duration of $T_0$=3.7 s. In the case of small wave heights and the generally associated slow wind speeds, it can also be advantageous to no longer track the rotor, as mentioned above, to the wind direction, but rather exclusively to the wave direction, i.e. so that the rotor plane is parallel to the waves. A motor-driven operation of the generator is then provided if necessary in order to reach the trundle speed. The alignment based on the waves can either take place, as mentioned above, through evaluation of the ratio of lateral and longitudinal oscillations of the tower or based on the named sensors for capturing the wave direction.

In normal mode, the method according to the invention is mainly used at wind speeds below the startup speed of the wind turbine, since in production mode, i.e. in a mode of the wind turbine, in which energy is dissipated, a sufficiently high rotor damping is present in most cases. In the case that the wind turbine should not be production-ready due to a malfunction, the method according to the invention can also be sensibly implemented at higher wind speeds as soon as a critical oscillation stimulus is present. This can for example be monitored through already existing two-dimensional acceleration sensors, which are already present in the pod or nacelle or the tower head 3, such as for example the sensors 8 and 9, which are shown schematically in FIG. 1. In individual cases, the method according to the invention can also be used at wind speeds above the startup speed, however only in the case of extraordinary environmental conditions when a critical wave stimulus is to be expected at high wind speeds.

Provided that the rotor is trundle-ready, for example in the case of malfunctions in the generator, in the converter or in the transformer area and provided there is a power supply, the rotor blade angles can be used wisely upon occurrence of mechanical impacts on the wind turbine, which lead to natural oscillations. At wind speeds above the startup speed, a constant control or regulation of the wind turbine should be performed with respect to the trundle frequency or the blade angle. If there is no power supply, a type of energy saving mode can be provided, in which the blade angle can be adjusted for example in specifiable or predetermined time intervals (for example every 10 minutes) through a short adjustment movement for the current wind speed. The same goes for the wind tracking of the tower head 3 in the azimuth. Auxiliary power supply devices (accumulators or an emergency power aggregate, e.g. a diesel aggregate) can be provided. A central control device monitors the operating state. Other systems are then preferably not active. When a specifiable or predetermined limit speed is exceeded or an auxiliary power supply fails, the blades should be set to a safe flag position via the accumulators to be preferably provided in the hub 4.

For the case when the system is on a network or there is network voltage, it is possible to set the blade angle to a specifiable or predetermined defined angle, such as e.g. 10°, or to regulate or control it depending on measured tower head accelerations with a preferably threshold value of approx. 0.4 $m/s^2$. In the case of a higher wind speed, the application of the blade angle wind speed curve according to FIG. 4 could be used. The tower head accelerations could also be monitored in this case. It is also possible, using the wave height, the separate distance and the speed, to calculate in advance whether corresponding oscillations can occur in a natural frequency of the wind turbine, which become problematic, whereupon the method according to the invention can take over or be started. An intelligent system can also be designed such that the oscillations of the wind turbine occurring in the case of these parameters are saved depending on the physical framework conditions (wave height, speed, separation distance, wind speed, temperature, air pressure and/or other parameters) so that the method according to the invention can also be implemented depending on already occurring cases of oscillations or already gained experience.

While specific embodiments of the invention have been described and illustrated, it is to be understood that theses embodiments are provided by way of example only and that the invention is not to be construed as being limited but only by proper scope of the following claims.

The invention claimed is:

1. A method for operating a wind turbine planted in a floor of a body of water comprising the steps of:
providing a support structure and a rotor arranged on the support structure, the rotor having a rotor blade; and
operating the wind turbine in trundle mode in order to reduce the oscillations in the support structure created by mechanical impacts on the support structure.

2. The method according to claim 1, wherein the mechanical impacts on the support structure are induced by water waves.

3. The method according to claim 1, wherein the wind turbine delivers no power to a network during the performance of the method.

4. The method according to claim 1, wherein the wind turbine has a blade angle adjustment device, and wherein a predetermined blade angle is set depending on at least one parameter.

5. The method according to claim 4, wherein the predetermined blade angle is set depending on a trundle speed and/or a wind speed and/or a measured oscillation amplitude of the support structure.

6. The method according to claim 1, wherein a predetermined trundle speed is set.

7. The method according to claim 6, wherein the trundle speed is set depending on a wind speed and/or an average blade angle.

8. The method according to claim 1, wherein a trundle speed, in particular at wind speeds above 3 m/s, lies between 10% and 80%, in particular between 15% and 60% of a nominal speed of the wind turbine.

9. The method according to claim 1, wherein at least one parameter (measurement value) of a wave height, a wave separation distance, a wave speed, a wave direction, a tower head acceleration, an oscillation amplitude of the support structure, an average wind speed or an average trundle speed is measured and compared with a predetermined parameter (standard value) and a trundle speed or a blade angle or a tracking angle of the rotor is controlled or regulated depending on the result of the comparison.

10. The method according to claim 1, wherein the rotor tracks to a wind direction, and wherein the wind tracking depends on the wind direction and/or a ratio of amplitudes of a tower head longitudinal to a tower head lateral oscillation.

11. The method according to claim 1, wherein a lower and/or an upper speed limit value of the rotor can be specified, and wherein a change is made to a blade angle of the rotor blade when the lower speed limit value is fallen short of or when the upper speed limit value is exceeded.

12. The method according to claim 1, wherein the rotor blade is set to a flag position when there is no power supply.

13. The method of claim 1, wherein a software product is provided, wherein the software product includes a program code means to execute the steps in accordance with the method on a computer and/or a control or regulation device of the wind turbine.

14. The method according to claim 13, wherein the software product can be saved on at least one data carrier or medium.

15. The method of claim 13, wherein a control or regulation device for the wind turbine is provided to run the software product.

16. A wind turbine planted in a floor of a body of water comprising:
- a support structure;
- a rotor having a rotor blade;
- a sensor; and
- a control or regulation device,
- wherein the sensor measures the amplitude, the acceleration and/or the direction of an oscillation of the support structure and/or an acceleration of the support structure and/or at least one physical variable, which mechanically impacts the wind turbine, and
- wherein the control or regulation device, only when wind speeds encountered by the rotor are below a start up speed of the wind turbine, specifies a blade angle of the rotor blade or a trundle speed for reducing the oscillations in the support structure created by mechanical impacts on the support structure based on the measurement by the sensor.

17. The wind turbine according to claim 16 further comprising a blade angle adjustment device, which sets the blade angle specified by the control or regulation device.

18. The wind turbine according to claim 16 further comprising a calculating device,
- wherein the sensor measures an average trundle speed of the rotor or the calculating device determines the average trundle speed of the rotor, and
- wherein the control or regulation device is processed in order to specify the blade angle of the rotor blade.

19. The wind turbine according to claim 16, wherein the sensor measures a wave height, a wave separation distance and/or a wave speed, and wherein the measurement value or the measurement values is/are processed in the control or regulation device in order to specify the blade angle of the rotor blade.

* * * * *